(12) United States Patent
Cockram et al.

(10) Patent No.: US 7,896,383 B2
(45) Date of Patent: Mar. 1, 2011

(54) FIFTH WHEEL HITCH

(75) Inventors: Anthony M. Cockram, Ganger, IN (US); Rodney Peterson, Elkhart, IN (US); Christopher Moore, Elkhart, IN (US); David Hoover, Sturgis, MI (US)

(73) Assignee: The Coast Distribution System, Inc., Morgan Hill, CA (US)

( * ) Notice: Subject to any disclaimer, the term of this patent is extended or adjusted under 35 U.S.C. 154(b) by 0 days.

(21) Appl. No.: 12/572,124

(22) Filed: Oct. 1, 2009

(65) Prior Publication Data

US 2010/0084836 A1     Apr. 8, 2010

Related U.S. Application Data

(60) Provisional application No. 61/195,143, filed on Oct. 2, 2008.

(51) Int. Cl.
*B62D 53/06*     (2006.01)
(52) U.S. Cl. ....................................................... 280/434
(58) Field of Classification Search .................. 280/434, 280/433
See application file for complete search history.

(56) References Cited

U.S. PATENT DOCUMENTS

| | | | |
|---|---|---|---|
| 2,784,984 A | 3/1957 | Sherman | |
| 2,977,137 A | 3/1961 | Durham | |
| 5,456,484 A | 10/1995 | Fontaine | |
| 5,516,137 A | 5/1996 | Kass et al. | |
| 6,095,544 A | 8/2000 | Flater | |
| 6,726,234 B2 | 4/2004 | Lund | |
| 7,182,362 B2 | 2/2007 | Yeakel | |
| 7,240,913 B2 | 7/2007 | Kahrs et al. | |
| 2004/0145150 A1 | 7/2004 | Yeakel | |
| 2006/0103109 A1 | 5/2006 | Flater | |
| 2006/0220344 A1 | 10/2006 | Kahrs et al. | |
| 2007/0194555 A1 | 8/2007 | Roberts et al. | |

*Primary Examiner* — Tony H. Winner
(74) *Attorney, Agent, or Firm* — Kolisch Hartwell, P.C.

(57) ABSTRACT

A fifth wheel hitch assembly is provided for use with a kingpin, the hitch assembly including a hitch frame including a throat for receiving the kingpin therein, a jaw member pivotally coupled to the hitch frame and moveable between an open orientation and a closed orientation, and a locking arm having a cooperative relationship with the jaw member. One of the jaw member and locking arm defines a guide surface and another of the jaw member and locking arm includes a follower configured to traverse the guide surface, traverse of the follower along a guide segment of the guide surface directing rotation of the jaw member between the open orientation and the closed orientation, and traverse of the follower along a lock segment directing releasable locking of the jaw member in the closed orientation.

17 Claims, 4 Drawing Sheets

FIFTH WHEEL HITCH

CROSS-REFERENCE TO RELATED APPLICATIONS

This application claims priority from U.S. Provisional Patent Application Ser. No. 61/195,143 of Anthony Michael Cockram for FIFTH WHEEL HITCH FOR THE RECREATION VEHICLE MARKET, filed Oct. 2, 2008, the disclosure of which is hereby incorporated by reference.

BACKGROUND

Most RV owners couple trailers to their vehicles only occasionally. Accordingly, they may not be entirely familiar with the process of coupling a trailer to a towing vehicle, and thus may couple their trailer to their vehicle incorrectly. In some instances, incorrect trailer coupling can make it possible for the trailer to become detached from the towing vehicle (referred to as a "dropped trailer"), which can cause considerable damage to both the towing vehicle and the trailer. If a trailer is dropped at highway speeds, the event can lead to tragic results.

One of the more common causes of dropped trailers is improper alignment of the trailer and towing vehicle during coupling. For example, some fifth wheel hitch designs permit the trailer kingpin to be inserted into the throat of the hitch without regard to the elevation of the kingpin relative to the hitch. The kingpin thus may inadvertently be placed on top of the jaw member of the hitch, rather than in a position wherein the jaw member would be able to close around (or otherwise capture) the kingpin. This condition (referred to in the industry as "high pinning") may be exacerbated in fifth wheel hitches that permit closure of the jaw member even when the kingpin is not in the correct position. In such hitches, the user may be given the impression that a trailer is safely coupled to the towing vehicle and locked in place, when it is not.

A dropped trailer also may occur when a trailer kingpin is not fully engaged by the jaw member, or where a user fails to lock the hitch once the kingpin is in place. For example, a user may attempt to couple the trailer to the towing vehicle when the jaw member is already closed. The kingpin thus may contact the closed jaw member and stop, before fully entering the throat of the hitch. Under these circumstances, the kingpin would not be captured by the jaw member. Similarly, a user may fail to move the vehicle far enough back to bring the kingpin fully within the throat of the hitch, and thereafter, may close the jaw member without capturing the kingpin.

Hitch manufacturers often recommend testing the hitch coupling before towing a load. A user thus may pull the towing vehicle forward slightly before locking the hitch (referred to as a "tug-pull test"). With the trailer wheels chocked, the trailer shouldn't move and the user should feel the resistance of the trailer. Unfortunately, not all users perform such a procedure, and even if they do, the test is not fool proof. In some instances, the kingpin may be secured sufficiently to feel solid during a tug-pull test (e.g., due to frictional forces), but may not be truly secured. A user relying on a tug-pull test thus may lock the hitch under the illusion that the trailer is safely secured in place. The towing vehicle then may be driven until the load is great enough to dislodge the trailer from the hitch, resulting in a dropped trailer.

DETAILED DESCRIPTION

The present disclosure provides, among other features, a fifth wheel hitch assembly configured to automatically secure a trailer to a towing vehicle upon insertion of a trailer kingpin into a receiving throat of the hitch assembly. The hitch assembly may be mounted in the bed of a towing vehicle such as a pick-up truck, typically over the rear axle of the vehicle so as to support the trailer load.

Figure 1:
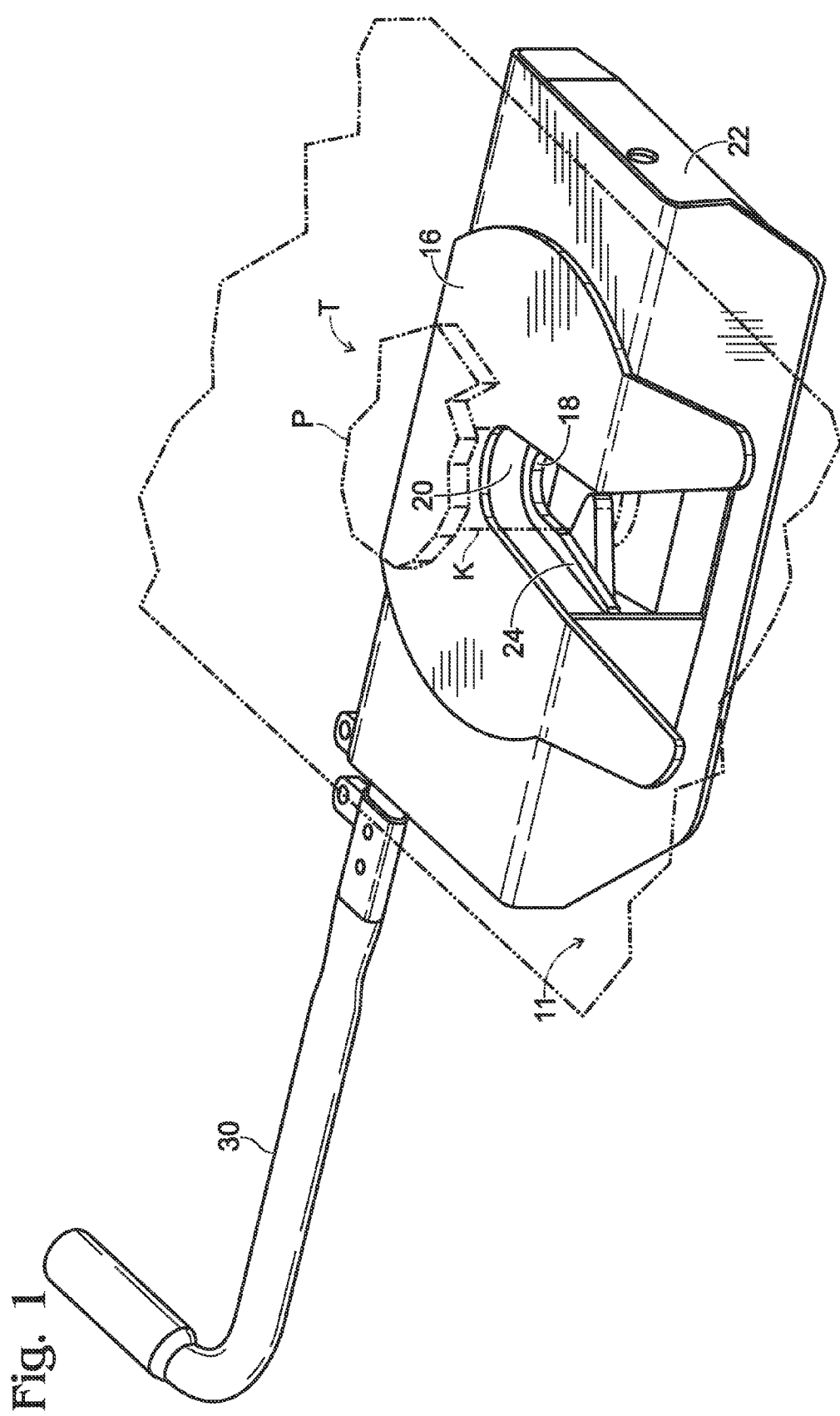
FIG. 1 is a top perspective view of a fifth wheel hitch assembly secured to a towing vehicle for receipt of a trailer kingpin in accordance with an embodiment of the present disclosure.

FIG. 1 depicts an exemplary fifth wheel hitch assembly 10, the hitch assembly being secured to a towing vehicle 11 for use in selectively coupling a trailer T to the towing vehicle for towing. As indicated, the trailer may include a kingpin K mounted to the underside of a pin box P. Kingpin K typically is situated at or near the leading edge of the trailer to provide for connection between the trailer and the towing vehicle as described herein. The kingpin generally is configured such that it may be grasped by hitch assembly 10, and the hitch assembly is configured such that the kingpin may be locked in place so as to secure the trailer to the towing vehicle for towing.

During use, kingpin K carries fore, aft, and side-to-side loads. The bottom surface of pin box P carries vertical (up-down) loads. The kingpin may take the form of a steel cylinder, having a diameter of approximately 2.875 inches, and may extend distally from the pin box approximately 3.25 inches. The kingpin also may define a groove G, the kingpin diameter being reduced to approximately 2 inches within such groove. Groove G typically is approximately 1.5 inches high, and may be positioned immediately above a button B at the distal end of the kingpin. The button typically has a diameter of approximately 2.875 inches, and extends approximately 0.5 inches from the distal end of the kingpin. Button B thus may be configured to prevent kingpin K from being pulled vertically up and out of the hitch assembly when the kingpin is fully and properly seated in the hitch assembly.

Figure 2:
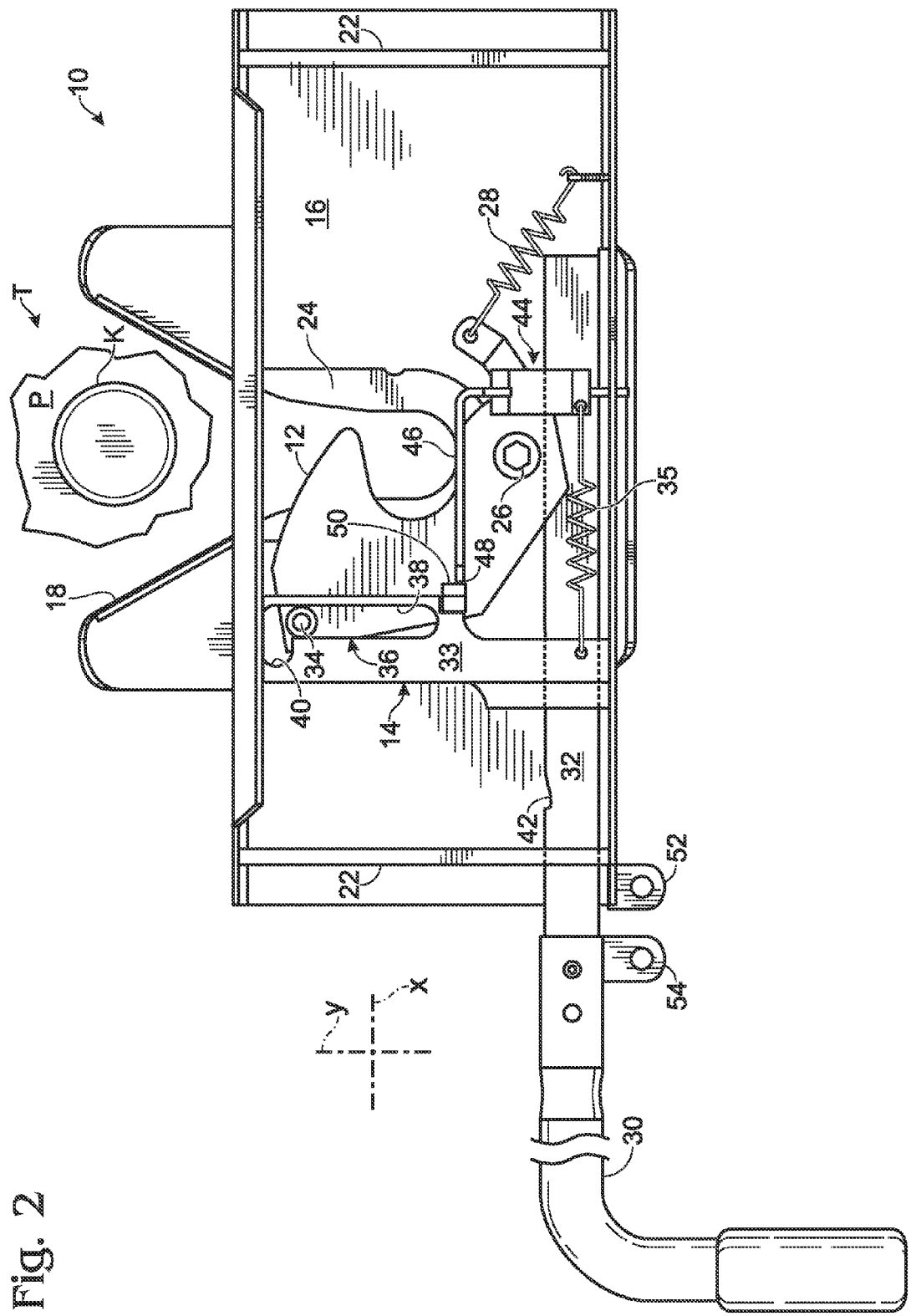
FIG. 2 is a bottom plan view of a fifth wheel hitch assembly in accordance with an embodiment of the present disclosure, wherein a jaw member of the hitch assembly is shown in a partially open orientation so as to accommodate receipt of a trailer kingpin.

Referring now to FIGS. 1 and 2, which show hitch assembly 10, it will be noted that the hitch assembly includes a top plate 16 and a peripheral skirt 20 that define a throat 18 configured for receipt of the kingpin. The top plate is supported on a hitch frame 22 that provides strength and rigidity to the hitch assembly. A fixed ledge 24 extends inwardly from peripheral skirt 20, and at least partially around throat 18. Ledge 24 may be shaped to fit generally within groove G of kingpin K upon insertion of the kingpin. The ledge also may be configured to guide the kingpin into the hitch assembly during coupling of the trailer and the towing vehicle, and may reduce the risk of accidental high pinning.

As indicated, the depicted hitch employs a pivotal jaw member 12 configured to selectively grasp a kingpin upon insertion of the kingpin into the hitch throat. Jaw member 12 may be disposed directly beneath ledge 24, and may be pivotally coupled to frame 22 (via a pivot pin 26) for movement between open and closed orientations. The jaw member may be generally hook-shaped, thus providing an arcuate kingpin-engaging surface configured to substantially encircle the kingpin when closed.

FIG. 2 depicts jaw member 12 just prior to insertion of the kingpin. Upon insertion, the kingpin will engage the jaw, urging the jaw toward a fully open orientation, throat 18 thus being clear to accommodate receipt of the kingpin. A releasable locking assembly 14 may be employed to selectively hold the jaw in the fully open orientation, the locking assembly being operable via a user-accessible handle 30.

Handle 30 may be secured to a control rod 32 that extends through an aperture in the hitch frame. The control rod, in turn, may be fixed to a locking arm 33, which is configured for side-to-side travel (along the indicated x-axis) within hitch frame 22. Locking arm 33 also may be in cooperative relation with jaw member 12 to direct movement of the jaw member for grasping and/or releasing the kingpin. In some embodiments, the locking arm may travel fore and aft along tracks formed in the frame so as to ensure fluid movement of the jaw member between the open and closed orientations.

In accordance with our teachings, the jaw member will be seen to include a follower 34 configured for travel along a guide surface 36 of locking arm 33. As shown, follower 34 may take the form of a roller, and guide surface 36 may take the form of a slotted passage that receives the roller so as to maintain a cooperative relation between the jaw member and the locking arm. The roller thus may travel along an interior surface of the slotted passage upon transverse movement of the locking arm. The jaw member, in turn, will pivotally open and close with such movement of the locking arm. Correspondingly, the jaw member effectively may be secured in place by preventing movement of the locking arm.

While the depicted embodiment places the pin on the jaw member, and the guide surface on the locking member, it will be understood that other arrangements are possible. For example, the hitch assembly similarly could employ a locking member with a pin configured for travel along a guide surface on the jaw member of the hitch. In either embodiment, a cooperative camming relation is established between the jaw member and the locking arm.

Referring still to FIG. 2, it will be noted that slotted passage 36 may form an L-shaped guide, a first portion of the guide (extending along the indicated y axis) defining a jaw guide segment 38, and a second portion of the guide (extending along the indicated x axis) defining a jaw lock segment 40. The angle between the depicted jaw guide segment and jaw lock segment is approximately 90 degrees. However, it will be appreciated that the slotted passage may be may take other forms. For example, the angle between the jaw guide segment and the jaw lock segment may be less than, or greater than, 90 degrees and/or the lengths of the jaw guide segment and the jaw lock segment may be longer or shorter.

Figure 3:
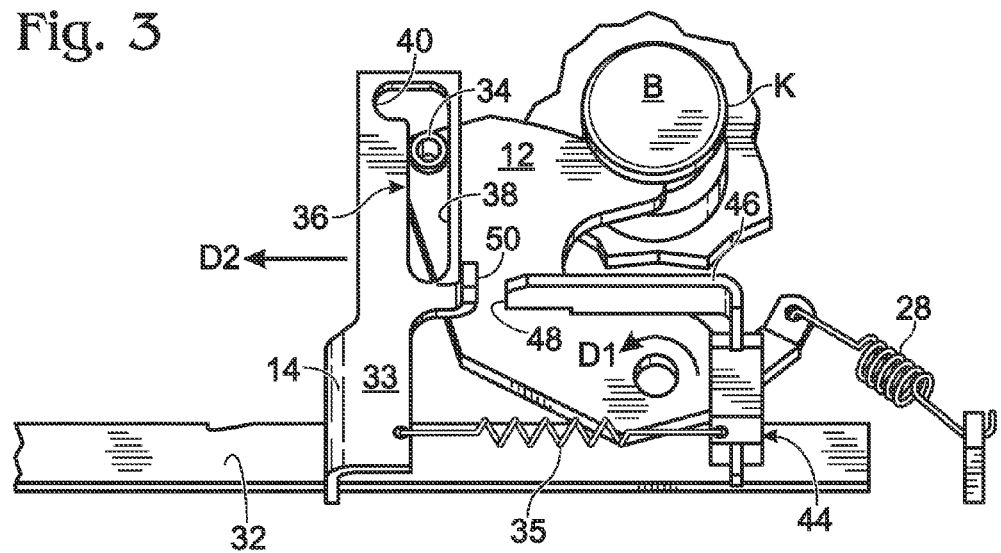
FIG. 3 is a fragmentary perspective view of the hitch assembly of FIG. 2, showing a jaw member and a locking arm in isolation during receipt of the trailer kingpin.

Movement of roller 34 within slotted passage 36 also may be described with reference to the indicated x axis and the y axis. For example, as will be described further with reference to FIGS. 3-6 below, jaw member 12 is opened and closed for insertion, capture and release of the kingpin K upon travel of the roller along the y axis within jaw guide segment 38. Similarly, jaw member 12 may be locked in a fully closed orientation (shown in FIG. 4) upon travel of the roller along the x axis within jaw lock segment 38. Both jaw member 12 and locking arm 33 move upon travel of roller 34 within the jaw guide segment 38. Specifically, as indicated in FIG. 3, during downward travel of the roller within the slotted passage (travel away from jaw lock segment 40), jaw member 12 rotates in a direction indicated at D1, and locking arm 14 moves transversely in a direction indicated at D2. During upward travel of the roller within the slotted passage (travel toward jaw lock segment 40), jaw member 12 rotates in a direction opposite to that indicated at D1, and locking arm 33 moves transversely in a direction opposite to that indicated at D2.

Figure 4:
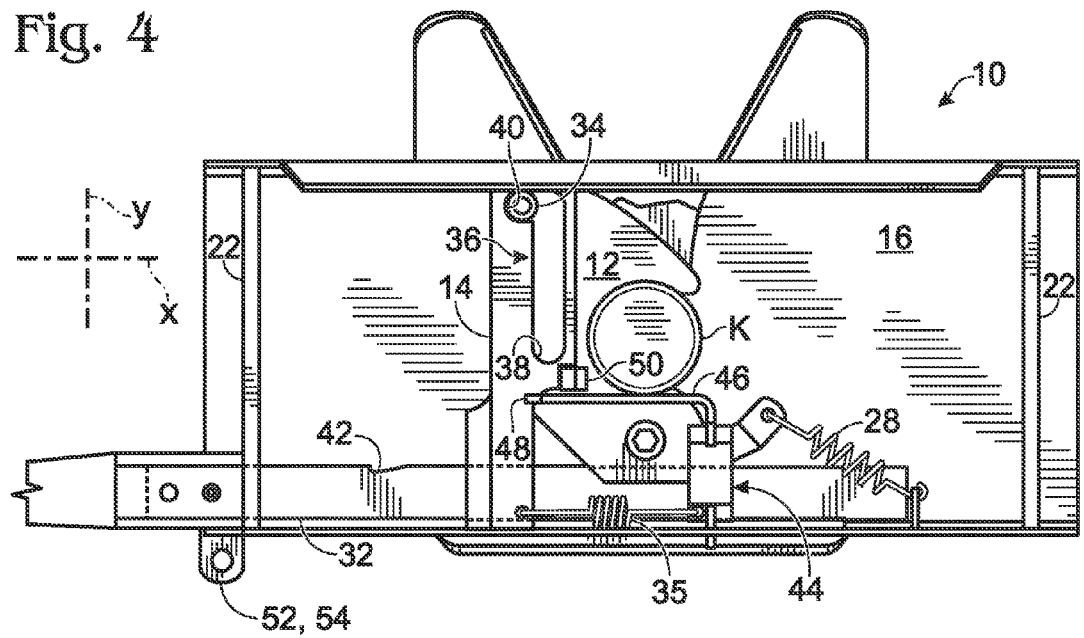
FIG. 4 is a bottom plan view of the hitch assembly of FIG. 2, wherein the jaw member is fully closed so as to secure the trailer kingpin in the hitch throat.
Figure 5:
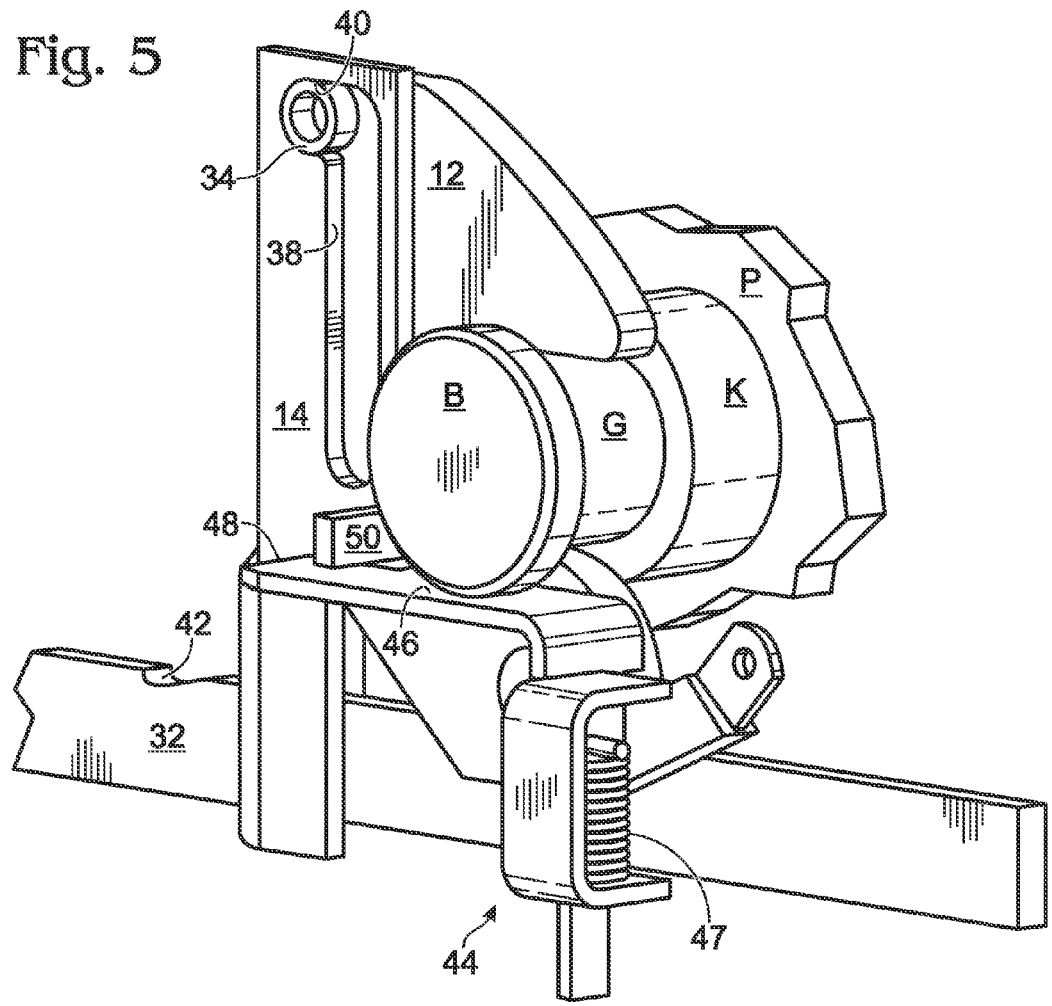
FIG. 5 is a fragmentary perspective view of the hitch assembly of FIG. 2, showing the jaw member and a locking arm in relation to a captured trailer kingpin.

Turning now to FIGS. 4 and 5, which show the kingpin fully and properly inserted into the hitch, it will be noted that the kingpin has been directed to the back of the throat and that jaw member 12 substantially encircles the kingpin (with the jaw seated in groove G of kingpin K). A biasing member, such as a tension spring 28, may be employed to bias jaw member 12 toward the depicted fully closed orientation. Correspondingly, roller 34 may be urged to travel along jaw guide segment 38 toward jaw lock segment 40 and locking arm 33 may be pulled toward the kingpin.

Once jaw member 12 is in the fully closed orientation, the jaw member may be locked in place by passage of roller 34 (along the indicated x axis) into the jaw lock segment of slotted passage 36. The jaw member thus will remain locked until the roller is removed from jaw lock segment 40, typically by pulling on control rod 32 to draw locking arm 33 away from the kingpin. In some embodiments, control rod 32 (and/or locking arm 33) may be biased toward the locking position(s) shown in FIG. 4. For example, control rod 32 (and/or locking arm 33) may be biased by control rod biasing member 35, which may extend from the control rod 32 to a kingpin sensor assembly 44, discussed in further detail below. Upon pulling the control rod, the roller may be placed back into the jaw guide segment of slotted passage 36. The jaw member thus is again permitted to rotate in opposition to the bias of tension spring 28, thereby allowing release of the kingpin (shown in FIG. 6).

Figure 6:
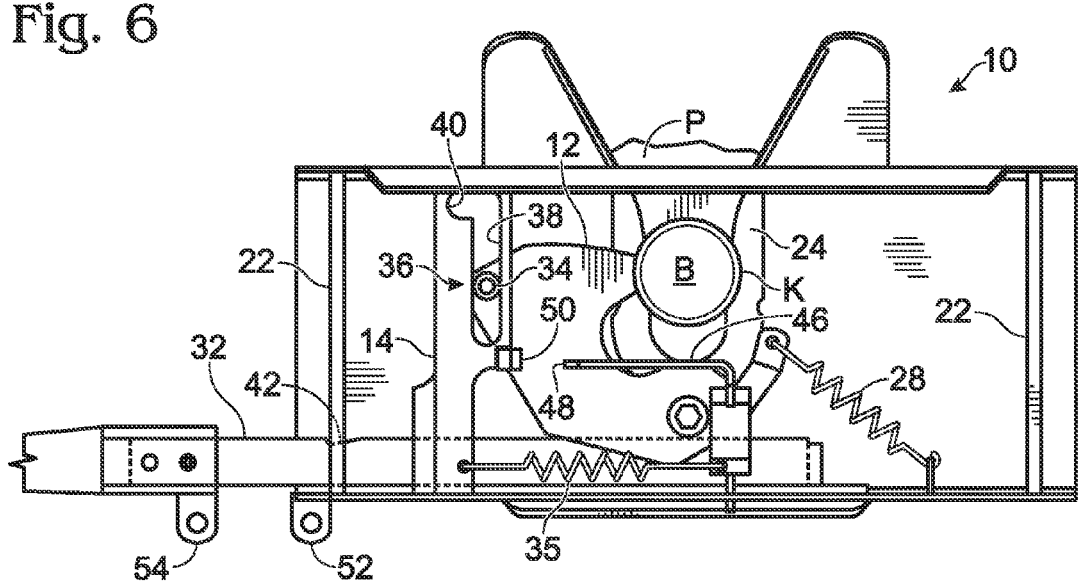
FIG. 6 is a bottom plan view of the hitch assembly of FIG. 2, showing the hitch assembly during removal of the trailer kingpin.

As best indicated in FIG. 6, control rod 32 may be provided with a detent 42 capable of coupling with hitch frame 22 to hold the control rod in an open position (against bias of the control rod toward the locking position). The jaw member thus correspondingly may be held in a fully open orientation against the bias of tension spring 28. It thus will be appreciated that the control rod and jaw member may be configured to accommodate decoupling of the trailer and hitch.

Referring now to another aspect of our teachings, it will be noted that hitch assembly 10 may include a kingpin sensor assembly 44 configured to ensure that jaw member 12 is locked in place only upon full and proper insertion of the kingpin. Toward this end, kingpin sensor assembly 44 may include a moveable sensor plate 46 disposed at the back of throat 18. More particularly, it will be appreciated that the sensor plate is positioned such that a properly aligned kingpin engages the sensor plate upon reaching the back of the hitch throat. The sensor plate 46 is biased toward an anti-lock position, for example by sensor plate biasing member 47, which prevents movement of locking arm 33 to a locking position.

As shown in FIG. 2, when sensor plate 46 is in the anti-lock position (e.g., in the absence of a fully and properly inserted kingpin K), a sensor plate end 48 may abut a stop 50 on locking arm 33. The sensor plate thereby is configured to oppose movement of roller 34 into jaw lock segment 40 of slotted passage 36, except upon full and proper insertion of the kingpin. Correspondingly, the jaw member may not be locked in place until the kingpin is fully and properly inserted in the hitch throat (with button end B engaging sensor plate 46). As shown in FIG. 4, once the kingpin is fully and properly inserted, the sensor plate is moved out of the path of the locking arm, and sensor plate end 48 is permitted to travel past stop 50 on locking arm 33.

As described above, the hitch assembly 10 may automatically and releasably grasp or "lock in" a kingpin upon full and proper insertion of the kingpin into the hitch throat. Additional locking mechanisms thus may not be required, although in some embodiments, may still be employed. For example, FIG. 2 depicts cooperative eyelets 52, 54 that may be aligned, and then secured in such aligned configuration using a padlock or the like. First eyelet 52 may extend from frame 22, and second eyelet 54 may extend from control rod 32, providing for fixing of the control rod relative to the frame. This effectively fixes locking arm 33 in place, and thus fixes jaw member 12 in place. It will be appreciated that the depicted arrangement provides for "locking in" the kingpin only when the kingpin is fully and properly inserted.

In some embodiments, the hitch assembly may provide a visual cue that the kingpin is fully and properly inserted, giving the user a way to quickly inspect the hitch assembly before use. For example, eyelets 52 and 54 may act as status indicators, misalignment of such eyelets serving to indicate to the user that the jaw member is not locked in place (whether or not the eyelets are secured together by a padlock).

Operation of hitch assembly 10 in accordance with the present disclosure may be described as follows. Initially, jaw member 12 may be in a partially open orientation, as shown in FIG. 2, and ready to receive a kingpin K. The shape of jaw member 12 may be configured such that pressure against an edge of jaw member 12 by kingpin K causes the jaw member to rotate in a counterclockwise direction (as viewed in FIG. 2) to allow insertion of the kingpin. As a result of the relationship between jaw member 12 and locking arm 33, rotational movement of the jaw member causes the locking arm to move transversely, and causes a pin or roller 40 to travel within jaw guide segment 38 of slotted passage 36.

Upon full insertion of the kingpin, kingpin button B abuts and depresses sensor plate 46, thereby moving the sensor plate out of the path of the locking arm. Jaw member 12 is biased for rotational in a clockwise direction (as viewed in FIG. 4) to close around the kingpin and to seat in kingpin groove G. Once the jaw member is fully closed, the locking arm is biased to the right (as viewed in FIG. 4) to accommodate travel of roller 34 into jaw lock segment 40 of slotted passage 36. The jaw lock segment thereby may be employed to releasably prevent any rotational movement of jaw member 12. Also, in the fully closed orientation, first and second eyelets 52, 54 are aligned, giving the user visual confirmation that the kingpin K is fully and properly inserted. The user may then secure the first and second apertures 52, 54 together.

The user may decouple the trailer from the hitch assembly by pulling on handle 30, thereby moving locking arm 33. Movement of the locking arm, in turn, disengages roller 34 from jaw lock segment 40. Thereafter, further movement of the locking arm causes the roller to travel along jaw guide segment 38, and causes counterclockwise rotation (as viewed in FIG. 6) of the jaw member 12 a fully open orientation. The kingpin K may then be removed from throat 18, and the sensor plate 46 returns to the anti-lock position.

A user may hold the jaw member in the fully open orientation by engaging a detent 42 in the control rod with the hitch frame 22. It has been found that as the kingpin comes out of the throat, it rocks the jaw member 12. This rocking may slide the detent 42 out of engagement with the frame, allowing the jaw member to return to the partially open state of FIG. 1, wherein the sensor plate end 48 abuts the stop 50.

The components expressed so far descriptively, may be mounted on a framework that supports such components so that they are positioned for the desired mechanical and operational advantage between the components. Scaling of the individual components, and overall proportions, are variable and relative to the user's operational specifications.

With respect to the above description then, it is to be realized that the optimum dimensional relationships for the parts of the claimed fifth wheel hitch system, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

Therefore, the foregoing is considered as illustrative only of the principles of the system. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A fifth wheel hitch assembly for use with a kingpin, the hitch assembly comprising:
    a hitch frame including a throat for receiving the kingpin therein;
    a jaw member pivotally coupled to the hitch frame and moveable between an open orientation and a closed orientation; and
    a locking arm having a cooperative relationship with the jaw member;
    wherein one of the jaw member and locking arm defines a guide surface and another of the jaw member and locking arm includes a follower configured to traverse the guide surface, traverse of the follower along a guide segment of the guide surface directing rotation of the jaw member between the open orientation and the closed orientation, and traverse of the follower along a lock segment directing releasable locking of the jaw member in the closed orientation.

2. The fifth wheel hitch assembly of claim 1, further including a control rod wherein selected movement of the control rod removes the follower from the lock segment.

3. The fifth wheel hitch assembly of claim 2, wherein the control rod defines a detent configured to engage the hitch frame to retain the jaw member in the open orientation.

4. The fifth wheel hitch assembly of claim 2, wherein the control rod includes a first lock indicator and the hitch frame includes a second lock indicator, the first and second lock indicators being configured to align when the follower traverses the lock segment of the guide surface.

5. The fifth wheel hitch assembly of claim 1, further comprising a biasing member configured to bias the jaw member toward the closed orientation.

6. The fifth wheel hitch assembly of claim 1, further comprising a ledge protruding from the throat of the hitch frame.

7. A fifth wheel hitch assembly for use with a kingpin, the hitch assembly comprising:
    a hitch frame including a throat for receiving the kingpin therein;
    a jaw member adjacent the throat, the jaw member including a follower and moveable between an open orientation and a closed orientation;
    a control rod moveably coupled to the hitch plate; and a locking arm having a guide surface configured to engage the follower, the guide surface including a guide segment configured to allow rotation of the jaw member and the locking arm, and a lock segment configured to releasably prevent rotation of the jaw member but to allow translation of the locking arm;

wherein the follower engages the lock segment when the jaw member is in the closed orientation and movement of the control rod disengages the follower from the lock segment.

8. The fifth wheel hitch assembly of claim 7, wherein the control rod includes a detent configured to engage the hitch plate to retain the jaw member in the open orientation.

9. The fifth wheel hitch assembly of claim 7, wherein the control rod includes a first lock indicator and the hitch frame includes a second lock indicator, the first and second lock indicators being configured to align when the follower traverses the lock segment of the guide surface.

10. The fifth wheel hitch assembly of claim 7, further comprising a spring configured to bias the jaw member to the closed orientation.

11. A fifth wheel hitch assembly for use with a kingpin, the hitch assembly comprising:

a hitch frame defining a throat for receiving the kingpin therein;

a jaw member adjacent the throat of the hitch frame and moveable between a fully open orientation and a fully closed orientation;

a locking arm moveably coupled to the hitch frame and having a cooperative relationship with the jaw member, the locking arm including a guide surface having a lock segment configured to releasably lock the jaw member in the fully closed orientation; and a kingpin sensor adjacent a rear portion of the throat, the kingpin sensor being moveable between a first position wherein the kingpin sensor releasably retains the jaw member in an at least partially open orientation and a second position wherein the kingpin sensor allows movement of the jaw to a fully closed orientation.

12. The fifth wheel hitch assembly of claim 11, further including a control rod slidably coupled to the hitch frame and fixed to the locking arm, wherein movement of the control rod disengages the follower from the lock segment.

13. The fifth wheel hitch assembly of claim 12, wherein the control rod is configured to engage the hitch frame to releasably retain the jaw member in an at least partially open orientation.

14. The fifth wheel hitch assembly of claim 13, wherein the control rod includes a first lock indicator and the hitch frame includes a second lock indicator, the first and second lock indicators being configured to align when the follower is disposed along the lock segment.

15. The fifth wheel hitch assembly of claim 11, wherein the jaw member is biased into the fully closed orientation.

16. The fifth wheel hitch assembly of claim 11, wherein the kingpin sensor is biased to the first position.

17. The fifth wheel hitch assembly of claim 11, further comprising a ledge extending at least partially around the throat.

* * * * *